March 12, 1963  M. C. EDLUND  3,081,246
NUCLEAR REACTOR AND METHOD OF OPERATING SAME
Filed May 29, 1957  2 Sheets-Sheet 1

INVENTOR.
Milton C. Edlund
BY
*J.P. Moran*
ATTORNEY

March 12, 1963  M. C. EDLUND  3,081,246
NUCLEAR REACTOR AND METHOD OF OPERATING SAME
Filed May 29, 1957 2 Sheets-Sheet 2
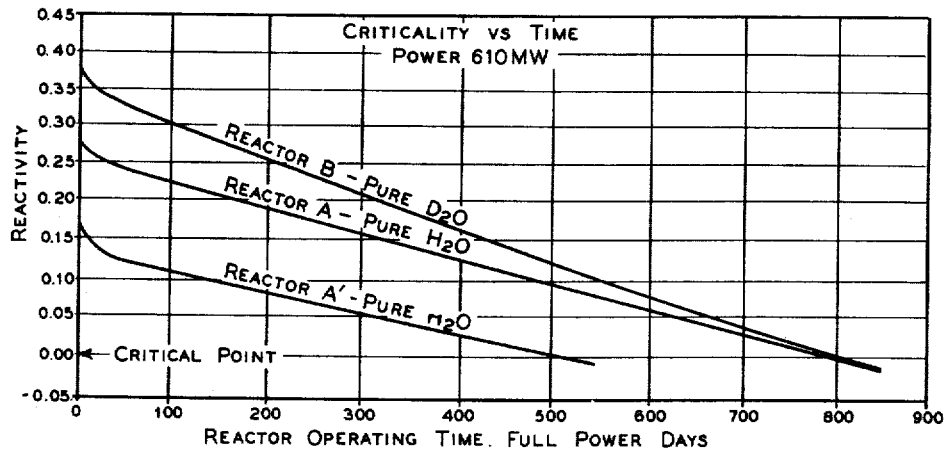
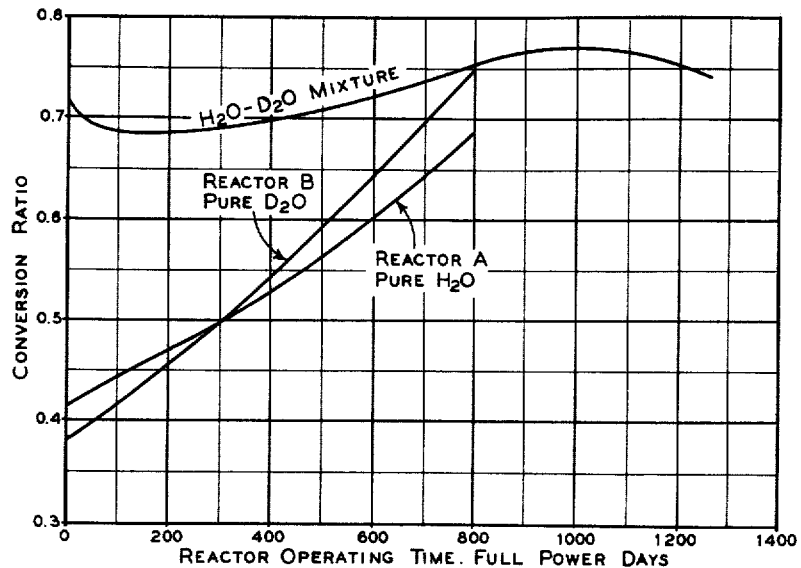
INVENTOR.
Milton C. Edlund
BY
*JPMoran*
ATTORNEY

3,081,246
Patented Mar. 12, 1963

3,081,246
NUCLEAR REACTOR AND METHOD OF OPERATING SAME
Milton C. Edlund, Lynchburg, Va., assignor to The Babcock & Wilcox Company, New York, N.Y., a corporation of New Jersey
Filed May 29, 1957, Ser. No. 662,458
4 Claims. (Cl. 204—193.2)

This invention relates in general to nuclear reactors wherein a fission chain reaction takes place, and more particularly it relates to a method and apparatus for operating a nuclear having large quantities of excess fuel therein.

In every nuclear reactor there must be arranged a quantity of fissionable material as a fuel and other materials such that there is a sufficient mass to produce a chain reaction. The mass of fissionable material is termed "a critical mass." In order to operate a non-breeder reactor for an appreciable period of time there must be included in the reactor an excess of fuel above the critical mass which represents the fuel which may be consumed during operation of the reactor. As this extra fuel makes available a quantity of neutrons greater than the quantity necessary to perpetuate a controlled chain reaction, these excess neutrons must be absorbed in some manner so that an uncontrolled reaction does not result. The inherent ability of the excess fuel to produce these excess neutrons is generally referred to as "excess reactivity."

The existing methods for the control of excess reactivity in reactors are based on the non-productive consumption of the excess neutrons by either using neutron absorbing materials, other than the fuel or fertile isotopes, or by allowing excessive diffusion or escape of neutrons out of the reactor. These methods of control include movable neutron absorbing control rods, such as hafnium metal, the use of burnable poisons, such as boron, the variation of moderator geometry, such as varying the height of heavy water in a natural uranium heavy water reactor, varying the position of a reflector, and the variation of the amount of fuel in the core such as in homogeneous reactors. These systems either vary the number of neutrons which escape from the periphery of the reactor or non-productivity absorb neutrons within the reactor or vary the amount of fuel in use.

As the fissionable material is consumed the reactor is controlled to maintain criticality for the reduced critical mass by increasing the moderating capacity. Inasmuch as it can be generally said that the critical mass decreases as the energy level of the neutrons approaches the thermal region, the present invention contemplates regulating a reactor by controlling the moderation of the reactor.

The invention herein is directed to the operation of a nuclear reactor in which the reactor is first set as a critical mass based on a predetermined moderation where the quantity of fuel is the maximum desired.

The invention further provides a method of operating a reactor in which the variable moderation is provided for by using a heavy and light water mixture in which the initial mixture has a high deuterium to hydrogen ratio, and the reactor is controlled by varying the ratio.

Further, it is provided that fertile material is arranged throughout the reactor so that the excess neutrons which are not captured to produce fission are productively captured in rather large quantities by the fertile material to result in a conversion to fissionable material, thus decreasing the net rate at which the fuel is consumed in the reactor and extending its life.

Moreover, the invention contemplates specific apparatus operating in accordance with the invention method which includes means for varying the moderation within the reactor.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

FIG. 3 is a curve showing the variation of criticality vs. time in the reactor of FIG. 1 compared to prior art reactors.

FIG. 4 is a curve showing the conversion ratio of the reactor of FIG. 1 vs. time compared to prior art reactors.

Nuclear reactors, including their theory and design, are fully described in U.S. Patent 2,708,656 of Fermi and Szilard, dated May 17, 1955, and the present invention may be applied to the specific embodiments shown therein. For a definition of the terms used herein reference should be made to "A Glossary of Terms in Nuclear Science and Technology," published April 1953, by the American Society of Mechanical Engineers.

Figure 1:
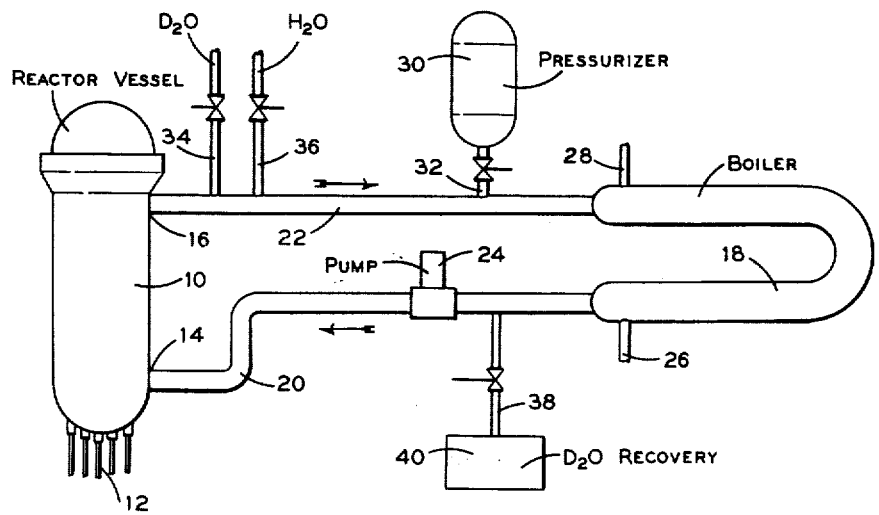
FIG. 1 is a semi-schematic diagram of a reactor system operated in accordance with the present invention.

In FIG. 1 there is schematically shown a pressurized water type nuclear reactor of the type described in detail in the "Proceedings of the International Conference on the Peaceful Uses of Atomic Energy," volume III, pp. 211 to 234. The reactor 10 is arranged with some control rods 12 and has primary coolant inlet 14 and outlet 16. A U-shaped shell and tube boiler 18 has its tube side connected to the reactor 10 by the delivery line 20 and return line 22. A pump 24 is located in the delivery line and arranged to continuously circulate the primary coolant, water, in a closed flow path through the reactor 10 where it absorbs heat and the boiler 18 where the heat is given to boiling water on the shell side thereof for the generation of steam. Feed water for the boiler enters by the inlet 26 and steam leaves by line 28 for further delivery to a point of use (not shown). A pressurizer 30 is connected to the return line 22 by a valved line 32 to maintain a high pressure on the water so that reactor heat may be transferred to the water coolant in the reactor without boiling.

The reactor is of the well known heterogeneous type and has a core in which bodies of fissionable and fertile material are arranged in distinct form. The fuel mass therein is greater than critical based on light water moderation by an amount necessary to maintain criticality during a predetermined period of operation. Thus the reactor is a thermal type where most fissions occur due to absorption of thermal neutrons; i.e. neutrons which have a mean kinetic energy determined by the operating temperature, which is about 0.025 electron volt at 300° K. The excess of fuel results in an excess reactivity which is a capacity for generating more neutrons than is required to sustain a chain reaction.

The present invention is primarily a method of operating the illustrated reactor in which the excess reactivity of the excess fuel is controlled by changing the neutron slowing down power or moderation to increase the average neutron energy in the reactor and when fertile material is present to increase the productive resonance capture of neutrons by the fertile material. The slowing down power of the reactor is its ability to slow the neutrons down from the energy of fission to increase the probability of capture in a fissionable atom. By varying the slowing down power or moderation of the reactor, control of the reactor is achieved and the conversion rate of fertile to fissionable material is increased.

By way of illustration, the invention method will be applied to the reactor arrangement of FIG. 1. The primary coolant for the reactor 10 comprises a mixture of heavy and light water high in deuterium. The quantity of deuterium present is adjusted until the reactor becomes critical with all of the control rods out of the core. Heavy water is controllably introduced into the return line 22 of the primary coolant system via the valve controlled line 34 and light water is put in by valve controlled line 36. The water mixture is blown down from the delivery line 20 via a valve controlled blown down line 38 to a heavy water recovery plant 40. The recovery plant separates the heavy water from the light water to make it available to line 34 as required. For a complete discussion of such a heavy water recovery system see "Production of Heavy Water," edited by G. M. Murphy et al., first edition, McGraw-Hill, 1955, pp. 17 to 30.

To increase the quantity of deuterium in the system and thus decrease the slowing down power, heavy water is controllably introduced through line 34 and an equal quantity of the water mixture is removed via line 38. As the fuel in the core is consumed, criticality is maintained by introducing light water via line 36 into the system and removing an equal quantity of water mixture. The specification for such a reactor is as follows:

| | |
|---|---|
| Core diameter | 7 ft. |
| Core height | 8 ft. |
| Reactor power | 610 mw. of heat. |
| Fuel | U–235 and U–233 as uranium oxide. |
| Fertile material | Thorium as thorium oxide. |
| Uranium loading | 670 kilograms. |
| Thorium loading | 18,000 kilograms of thorium oxide. |
| Metal to water ratio | 0.75. |
| Fuel element rod size | 0.375 inch O.D. |
| Cladding | 0.030 inch of Zircaloy-2. |
| Moderator - coolant — initially | 90% heavy water and 10% light water. |

Metal to water ratio is the quantity of solid metal to the quantity of water present in the reactor core.

The typical operating procedure for this reactor is to load the 670 kilograms of fuel into said core and to charge the reactor with the heavy and light water mixture (90/10). Adjust the deuterium to hydrogen ratio until the reactor is just critical as cold. Then bring to temperature by decreasing the D/H ratio. Bring to power by pulling out of the core a small control rod.

Adjust the deuterium to hydrogen ratio downwardly as needed to compensate for fuel burnup and production of fission products. Continue the reactor operation until it can no longer be maintained critical at the operating temperature by lowering the deuterium to hydrogen ratio.

The invention is based on the well known knowledge that the slower the neutron, the greater the probability there is for it to produce a fission in a fissionable atom. It is further well known that the deuterium atom has a lower capacity for slowing down neutrons than does the lighter hydrogen atom. Accordingly, the critical mass of fissionable material for a heavy water reactor can be made greater than the critical mass when using light water as a moderator in internal converter reactors. Accordingly, if light water is added to the heavy water in the reactor, more neutrons will be slowed down through the resonances of fuel and fertile material and the probability of fission occurring increased. Thus, as the number of fissionable atoms decreases due to consumption, criticality may still be maintained by the increased moderating effect of the light water dilution.

It is further noted that fertile materials such as thorium and U-238 have significant resonance capture cross sections in the neutron energy level above that of thermal and in the range of 0.4 to 200 electron volts. The fraction of fission neutrons captured in the resonances of the fertile material can be increased by reducing the moderation in the reactor core; i.e. by shifting the neutron energy spectrum to higher energies. This enables the fertile material to compete more favorably with structural materials for neutrons and as a result increases the conversion ratio and reduces the net fissionable fuel depletion rate.

Figure 2:
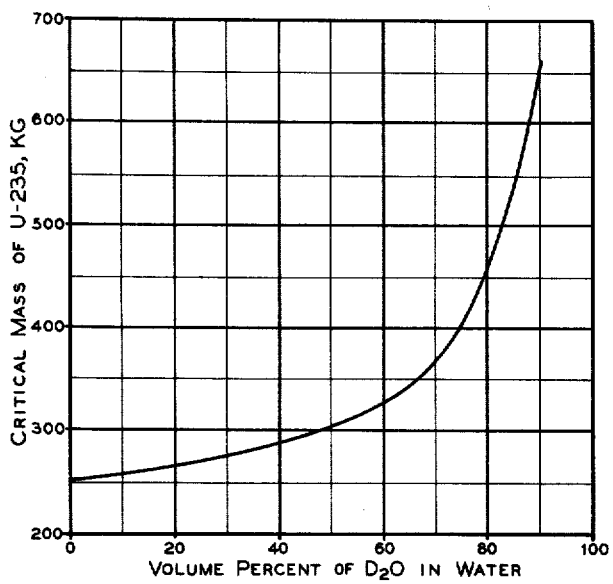
FIG. 2 is a curve showing the variation of critical mass vs. change in moderator of the reactor of FIG. 1.

FIG. 2 illustrates the calculated effect of changing of heavy water percentage on the critical mass of the exemplified reactor. It should be noted that the critical mass changes from 670 kg. to about 200 kg. at which point it is moderated with light water only.

The control of the reactor is effected by shifting the neutron energy spectrum and causing more neutrons to be utilized for fertile material conversion and having less neutrons available for thermal fission. The excess reactivity is thus controlled while increasing the conversion rate. Consequently, a more uniform flux distribution may be obtained as well as more operating time between fuel loadings. The following table is the calculated effect of the neutron energy shift:

| Percent D₂O by Volume | Percent Fraction of Fissions in Energy Range of 0.4 to 200 ev. |
|---|---|
| 0 | 12 |
| 50 | 20 |
| 70 | 27 |
| 80 | 30 |
| 90 | 32 |

To illustrate the advantage of the present invention it will be compared to prior art reactors conventionally controlled as follows:

*Reactor A*

Specifications:
| | |
|---|---|
| Core diameter | 7 ft. |
| Core height | 8 ft. |
| Reactor power | 610 mw. of heat. |
| Fuel | U–235 and U–233 as $UO_2$. |
| Fertile material | Thorium as $ThO_2$. |
| Metal to water ratio | 0.75. |
| Thorium loading | 18,000 kg. of $ThO_2$. |
| Rod size | 0.375 inch O.D. |
| Cladding | 0.030 inch of Zircaloy-2. |
| Moderator-coolant | Pure $H_2O$. |
| Control method | Conventional (control rods and/or burnable poisons) |

*Reactor B*

Specifications:
| | |
|---|---|
| Core diameter | 15.58 ft. |
| Core height | 14.5 ft. |
| Reactor power | 610 mw. of heat. |
| Fuel | U–235 and U–233 as $UO_2$. |
| Fertile material | Thorium as $ThO_2$. |
| Thorium loading | 18,000 kg. of $ThO_2$. |
| Metal to water ratio | 0.05. |
| Rod size | 0.375 inch O.D. |
| Cladding | 0.030 inch Zircaloy-2. |
| Moderator-coolant | 99.75% $D_2O$–0.25% $H_2O$. |
| Control methods | Conventional (control rods and/or burnable poisons). |

These core specifications represent typical designs of a power reactor system. A low metal to water (M./W.) ratio in reactor B is required to keep the critical mass reasonable. The large size is necessary to secure a power output of 610 mw. based upon the low M./W. and the same average heat flux assumed in A.

An increase in volume percent of $D_2O$ in the water, i.e. an increase in D/H, decreases the slowing down power and increases the critical mass.

The lifetime of reactors A, B, and the present invention were calculated on the basis of each core having sufficient initial loading of fuel to exceed the critical mass by approximately 350 kg. FIG. 3 shows the criticality of cores A and B as a function of operating time. Actually these two cores are unrealistic, since a reactivity of approximately 0.20 is normally the maximum value which can be controlled with conventional control rods. This makes lower loadings mandatory and shortens the core life as shown by curve marked reactor A′ in FIG. 3. However, this high initial loading can be achieved in the reactor of the present invention due to the presence of $D_2O$ in the small reactor.

Using the high initial fuel loadings and conventional control methods, the expected core life for reactor B is 840 days (FIG. 3), while use of the concept of control for which invention is claimed herein extends the expected core life to 1310 days (see FIG. 4). Compare this to the expected life of 540 days if the initial loading is reduced as in reactor A′ of FIG. 3 to provide an initial $k_{eff}$ (reactivity) of only 1.20 and conventional control rods are used. Approximately 300 days of life, 183,000 mwd., can be added by increasing the initial loading sufficiently to secure 350 kg. of initial excess mass instead of complying with the limitation of a maximum $k_{eff}=1.20$. An additional 490 days, almost 300,000 mwd., is added to the expected life due to the increase in conversion ratio obtained by using variation of slowing down power instead of conventional rods for control.

The significance of this effect on conversion ratio is shown in FIG. 4. A comparison of the average conversion ratio over the entire life for each of the cores reveals:

| Reactor Core | Life, Days | Coolant-Moderator | Average Conversion ratio |
| --- | --- | --- | --- |
| A | 840 | Pure $H_2O$ | 0.53 |
| Invention Reactor | 1,310 | $H_2O$-$D_2O$ Mixture | 0.71 |
| B | 840 | Pure $D_2O$ | 0.53 |

This clearly shows the benefits of control by changing the fraction of neutrons capture in the resonances of fertile material rather than by changing the non-productive consumption rate of neutron as in conventional methods.

Resonance capture of neutrons increases with a decrease in resonance escape probability, P. The lower probabilities thus the higher percentage of resonance absorptions, are obtained in the invention reactor containing $H_2O$—$D_2O$ mixtures. In order to use the proposed concept of shim control, the core must possess a low value for the resonance escape probability with a large $D_2O$ percent in the water. It is the ability to increase P by increasing the slowing down power, i.e., decreasing the D/H ratio, that allows control adjustments to keep the reactor critical during operation.

In a uranium-thorium internal converter reactor the control of the reactor by variation of the slowing down power in the core through variation of deuterium to hydrogen ratio, may increase the potential nuclear lifetime of a 610 mw. core from 540 days using conventional control methods to 1310 days. This is accomplished by:

(1) Obtaining control of high initial fuel loadings, thus allowing loading of large quantities of excess mass.

(2) Increasing the average conversion ratio by eliminating the non-productive losses of neutrons due to control mechanisms.

Although the invention has been illustrated with reference to a pressurized water reactor it is equally applicable to other types.

For instance, a fast neutron breeder reactor of the type described in volume III, pp. 135 to 142, "Proceedings of the International Conference on the Peaceful Uses of Atomic Energy," may be arranged so that slowing down power or moderation is added to the reactor as fuel is consumed to, in effect, decrease the critical mass. The increase in moderation may be furnished by graphite or beryllium rods inserted as required to maintain criticality.

Prior art reactors may be adapted to use the present invention method by simply substituting a variable moderator for the prior art systems of control. In that regard the following are some of the many variable moderators which may be used by varying the quantity of:

(1) Beryllium dust in fluidized graphite dust.
(2) Glass beads in light water.
(3) Graphite dust suspended in light water.
(4) Steam in graphite rods or matrix.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. A method of operating a nuclear reactor comprising arranging a quantity of fissionable material in distinct form as a core with a critical mass based on a predetermined moderation by a mixture of heavy water and light water, diluting the water mixture with light water to increase the slowing-down power during operation of said core to maintain a critical mass as fissionable material is consumed, and regulating the neutron chain reaction by varying the ratio of deuterium to hydrogen in the heavy water-light water mixture to control the neutronic reaction.

2. A method of operating a nuclear reactor comprising arranging a quantity of fissionable and fertile material in distinct form as a core with a critical mass based on a predetermined moderation by a mixture of heavy water and light water, diluting the water mixture with light water to increase the slowing-down power during operation of said core to maintain a critical mass as fissionable material is consumed, and regulating the neutron chain reaction by varying the ratio of deuterium to hydrogen in the heavy water-light water mixture to control the neutronic reaction.

3. A nuclear reactor comprising a body of fissionable material arranged as a plurality of fuel elements in a core, a body of light and heavy water mixture throughout said core having a high deuterium to hydrogen ratio and in such quantity as to make said core critical, and means for regulating the deuterium to hydrogen ratio during operation to maintain a critical mass.

4. A nuclear reactor comprising a body of fissionable and fertile material arranged as a plurality of distinct elements in a core, a body of light and heavy water mixture throughout said core having a high deuterium to hydrogen ratio and in such quantity as to make said core critical, and means for regulating the deuterium to hydrogen ratio during operation to maintain a critical mass.

References Cited in the file of this patent

UNITED STATES PATENTS 2,743,225    Ohlinger et al. _____ Apr. 24, 1956

OTHER REFERENCES

McCorkle: "Nucleonics," vol. 11, No. 5, May 1953.

Iskenderian et al.: "International Conference on the Peaceful Uses of Atomic Energy," vol. 3, pp. 157–168, August 1955.

Glasstone: "Principles of Nuclear Reactor Engineering," July 1955, pp. 32–34 and 741–743, D. Van Nostrand Co., Inc.

Glasstone: "Principles of Nuclear Reactor Engineering," July 1955, pp. 152–153, D. Van Nostrand Co., Inc.

UNITED STATES PATENT OFFICE
CERTIFICATE OF CORRECTION

Patent No. 3,081,246                        March 12, 1963

Milton C. Edlund

It is hereby certified that error appears in the above numbered patent requiring correction and that the said Letters Patent should read as corrected below.

Column 1, line 13, after "nuclear" insert -- reactor --; column 3, line 15, for "blown" read -- blow --; column 4, line 18, for "200 kg." read -- 260 kg. --; column 6, line 67, under "OTHER REFERENCES" after "1953" strike out the period and insert -- , pp. 21-25. --.

Signed and sealed this 8th day of October 1963.

(SEAL)
Attest:

ERNEST W. SWIDER
Attesting Officer

EDWIN L. REYNOLDS

Acting Commissioner of Patents